(12) United States Patent
Markuze et al.

(10) Patent No.: US 12,481,444 B2
(45) Date of Patent: Nov. 25, 2025

(54) SMART NIC RESPONDING TO REQUESTS FROM CLIENT DEVICE

(71) Applicant: VMware LLC, Palo Alto, CA (US)

(72) Inventors: Alex Markuze, Rosh HaAyin (IL); Shay Vargaftik, Herzliya (IL); Igor Golikov, Kfar Saba (IL); Yaniv Ben-Itzhak, Afek (IL); Avishay Yanai, Petach-Tikva (IL)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/845,766

(22) Filed: Jun. 21, 2022

(65) Prior Publication Data
US 2023/0409225 A1    Dec. 21, 2023

(51) Int. Cl.
*G06F 3/06* (2006.01)

(52) U.S. Cl.
CPC .......... *G06F 3/0647* (2013.01); *G06F 3/0604* (2013.01); *G06F 3/067* (2013.01)

(58) Field of Classification Search
CPC ...... G06F 3/0647; G06F 3/0604; G06F 3/067; G06F 3/061; G06F 3/0635; G06F 3/0659
USPC ........................................................ 711/212
See application file for complete search history.

(56) References Cited

U.S. PATENT DOCUMENTS

| | | |
|---|---|---|
| 5,884,313 A | 3/1999 | Talluri et al. |
| 5,887,134 A | 3/1999 | Ebrahim |
| 5,974,547 A | 10/1999 | Klimenko |
| 6,141,749 A | 10/2000 | Coss et al. |
| 6,219,699 B1 | 4/2001 | McCloghrie et al. |
| 6,393,483 B1 | 5/2002 | Latif et al. |
| 6,496,935 B1 | 12/2002 | Fink et al. |
| 6,594,704 B1 | 7/2003 | Birenback et al. |
| 6,738,821 B1 | 5/2004 | Wilson et al. |
| 6,856,995 B1 | 2/2005 | Bitayo et al. |
| 6,880,089 B1 | 4/2005 | Bommareddy et al. |
| 6,963,921 B1 | 11/2005 | Yang et al. |
| 7,055,173 B1 | 5/2006 | Chaganty et al. |
| 7,079,544 B2 | 7/2006 | Wakayama et al. |
| 7,136,926 B1 | 11/2006 | Iyer et al. |

(Continued)

FOREIGN PATENT DOCUMENTS

| | | |
|---|---|---|
| CA | 2672100 A1 | 6/2008 |
| CA | 2918551 A1 | 7/2010 |

(Continued)

OTHER PUBLICATIONS

Anwer, Muhammad Bilal, et al., "Building A Fast, Virtualized Data Plane with Programmable Hardware," Aug. 17, 2009, 8 pages, VISA'09, ACM, Barcelona, Spain.

(Continued)

*Primary Examiner* — Hua J Song
(74) *Attorney, Agent, or Firm* — Quarles & Brady LLP

(57) ABSTRACT

Some embodiments provide a method for transmitting data at a network interface controller (NIC) of a computer that operates as a server. The computer includes multiple storage devices. The method receives a request from a client device for a particular file. The method translates the particular file into a memory location corresponding to a particular one of the storage devices at the computer. The method transmits the requested file from the particular storage location to the client device.

22 Claims, 7 Drawing Sheets

(56) References Cited

U.S. PATENT DOCUMENTS

| | | |
|---|---|---|
| 7,349,382 B2 | 3/2008 | Marimuthu et al. |
| 7,424,710 B1 | 9/2008 | Nelson et al. |
| 7,512,071 B2 | 3/2009 | Goldschmidt et al. |
| 7,606,260 B2 | 10/2009 | Oguchi et al. |
| 7,760,733 B1 | 7/2010 | Eiriksson et al. |
| 7,774,502 B2 | 8/2010 | Murthy et al. |
| 7,818,452 B2 | 10/2010 | Matthews et al. |
| 7,849,168 B2 | 12/2010 | Utsunomiya et al. |
| 7,853,998 B2 | 12/2010 | Blaisdell et al. |
| 7,913,294 B1 | 3/2011 | Maufer et al. |
| 7,948,986 B1 | 5/2011 | Ghosh et al. |
| 8,032,933 B2 | 10/2011 | Turley et al. |
| 8,108,550 B2 | 1/2012 | Lahoti et al. |
| 8,145,768 B1 | 3/2012 | Hawthorne |
| 8,190,767 B1 | 5/2012 | Maufer et al. |
| 8,194,674 B1 | 6/2012 | Pagel et al. |
| 8,346,919 B1 | 1/2013 | Eiriksson et al. |
| 8,365,294 B2 | 1/2013 | Ross |
| 8,442,059 B1 | 5/2013 | Iglesia et al. |
| 8,615,009 B1 | 12/2013 | Ramamoorthi et al. |
| 8,660,129 B1 | 2/2014 | Brendel et al. |
| 8,825,900 B1 | 9/2014 | Gross, IV et al. |
| 8,856,518 B2 | 10/2014 | Sridharan et al. |
| 8,930,529 B1 | 1/2015 | Wang et al. |
| 8,931,047 B2 | 1/2015 | Wanser et al. |
| 9,008,082 B2 | 4/2015 | Dyke |
| 9,008,085 B2 | 4/2015 | Kamble et al. |
| 9,015,823 B2 | 4/2015 | Koponen et al. |
| 9,047,109 B1 | 6/2015 | Wang et al. |
| 9,116,727 B2 | 8/2015 | Benny et al. |
| 9,135,044 B2 | 9/2015 | Maharana |
| 9,143,582 B2 | 9/2015 | Banavalikar et al. |
| 9,148,895 B2 | 9/2015 | PalChaudhuri et al. |
| 9,152,593 B2 | 10/2015 | Galles |
| 9,154,327 B1 | 10/2015 | Marino et al. |
| 9,197,551 B2 | 11/2015 | DeCusatis et al. |
| 9,231,849 B2 | 1/2016 | Hyoudou et al. |
| 9,325,739 B1 | 4/2016 | Roth et al. |
| 9,378,161 B1 | 6/2016 | Dalal et al. |
| 9,380,027 B1 | 6/2016 | Lian et al. |
| 9,419,897 B2 | 8/2016 | Cherian et al. |
| 9,460,031 B1 | 10/2016 | Dalal et al. |
| 9,621,516 B2 | 4/2017 | Basak et al. |
| 9,634,990 B2 | 4/2017 | Lee |
| 9,692,698 B2 | 6/2017 | Cherian et al. |
| 9,697,019 B1 | 7/2017 | Fitzgerald et al. |
| 9,729,512 B2 | 8/2017 | Jain et al. |
| 9,755,903 B2 | 9/2017 | Masurekar et al. |
| 9,806,948 B2 | 10/2017 | Masurekar et al. |
| 9,825,913 B2 | 11/2017 | Jain et al. |
| 9,916,269 B1 | 3/2018 | Machulsky et al. |
| 9,952,782 B1 | 4/2018 | Chandrasekaran et al. |
| 10,050,884 B1 | 8/2018 | Dhanabalan et al. |
| 10,142,127 B2 | 11/2018 | Cherian et al. |
| 10,162,793 B1 | 12/2018 | BShara et al. |
| 10,193,771 B2 | 1/2019 | Koponen et al. |
| 10,284,478 B2 | 5/2019 | Yokota |
| 10,341,296 B2 | 7/2019 | Bhagwat et al. |
| 10,534,629 B1 | 1/2020 | Pierre et al. |
| 10,567,308 B1 | 2/2020 | Subbiah et al. |
| 10,873,566 B2 | 12/2020 | Han |
| 10,997,106 B1 | 5/2021 | Bandaru et al. |
| 11,005,755 B2 | 5/2021 | Yu et al. |
| 11,019,030 B2 | 5/2021 | Jain et al. |
| 11,038,845 B2 | 6/2021 | Han |
| 11,108,593 B2 | 8/2021 | Cherian et al. |
| 11,221,972 B1 | 1/2022 | Raman et al. |
| 11,385,981 B1 | 7/2022 | Silakov et al. |
| 11,593,278 B2 | 2/2023 | Kim et al. |
| 11,606,310 B2 | 3/2023 | Ang et al. |
| 11,636,053 B2 | 4/2023 | Kim et al. |
| 11,677,719 B2 | 6/2023 | Han |
| 11,716,383 B2 | 8/2023 | Kim et al. |
| 11,736,565 B2 | 8/2023 | Cherian et al. |
| 11,736,566 B2 | 8/2023 | Cherian et al. |
| 2002/0069245 A1 | 6/2002 | Kim |
| 2003/0005144 A1 | 1/2003 | Engel et al. |
| 2003/0093481 A1 | 5/2003 | Mitchell et al. |
| 2003/0097589 A1 | 5/2003 | Syvanne |
| 2003/0123452 A1 | 7/2003 | Cox et al. |
| 2003/0130833 A1 | 7/2003 | Brownell et al. |
| 2003/0140124 A1 | 7/2003 | Burns |
| 2003/0145114 A1 | 7/2003 | Gertner |
| 2003/0161272 A1 | 8/2003 | Teplitsky |
| 2003/0200290 A1 | 10/2003 | Zimmerman et al. |
| 2003/0212900 A1 | 11/2003 | Liu et al. |
| 2003/0217119 A1 | 11/2003 | Raman et al. |
| 2004/0022259 A1 | 2/2004 | Tuchow |
| 2004/0042464 A1 | 3/2004 | Elzur et al. |
| 2004/0049701 A1 | 3/2004 | Pennec et al. |
| 2005/0053079 A1 | 3/2005 | Havala |
| 2005/0114337 A1 | 5/2005 | Lunteren |
| 2005/0198125 A1 | 9/2005 | Beck et al. |
| 2005/0229246 A1 | 10/2005 | Rajagopal et al. |
| 2005/0238022 A1 | 10/2005 | Panigrahy |
| 2006/0002386 A1 | 1/2006 | Yik et al. |
| 2006/0029056 A1 | 2/2006 | Perera et al. |
| 2006/0041894 A1 | 2/2006 | Cheng et al. |
| 2006/0191003 A1 | 8/2006 | Bahk et al. |
| 2006/0206603 A1 | 9/2006 | Rajan et al. |
| 2006/0206655 A1 | 9/2006 | Chappell et al. |
| 2006/0236054 A1 | 10/2006 | Kitamura |
| 2007/0011734 A1 | 1/2007 | Balakrishnan et al. |
| 2007/0056038 A1 | 3/2007 | Lok |
| 2007/0061492 A1 | 3/2007 | Riel |
| 2007/0174850 A1 | 7/2007 | Zur |
| 2008/0008202 A1 | 1/2008 | Terrell et al. |
| 2008/0028097 A1 | 1/2008 | Makela |
| 2008/0072305 A1 | 3/2008 | Casado et al. |
| 2008/0086620 A1 | 4/2008 | Morris |
| 2008/0163207 A1 | 7/2008 | Reumann et al. |
| 2008/0267177 A1 | 10/2008 | Johnson et al. |
| 2008/0289028 A1 | 11/2008 | Jansen et al. |
| 2008/0298274 A1 | 12/2008 | Takashige et al. |
| 2009/0007251 A1 | 1/2009 | Abzarian et al. |
| 2009/0089537 A1 | 4/2009 | Vick et al. |
| 2009/0119087 A1 | 5/2009 | Ang et al. |
| 2009/0129271 A1 | 5/2009 | Ramankutty et al. |
| 2009/0129394 A1 | 5/2009 | Bar-Kovetz et al. |
| 2009/0150521 A1 | 6/2009 | Tripathi |
| 2009/0161547 A1 | 6/2009 | Riddle et al. |
| 2009/0161673 A1 | 6/2009 | Breslau et al. |
| 2009/0235325 A1 | 9/2009 | Dimitrakos et al. |
| 2009/0249470 A1 | 10/2009 | Litvin et al. |
| 2009/0249472 A1 | 10/2009 | Litvin et al. |
| 2009/0327781 A1 | 12/2009 | Tripathi |
| 2010/0014526 A1 | 1/2010 | Chavan et al. |
| 2010/0037311 A1 | 2/2010 | He et al. |
| 2010/0070677 A1 | 3/2010 | Thakkar |
| 2010/0100616 A1 | 4/2010 | Bryson et al. |
| 2010/0115174 A1 | 5/2010 | Akyol et al. |
| 2010/0115208 A1 | 5/2010 | Logan |
| 2010/0125667 A1 | 5/2010 | Soundararajan |
| 2010/0165874 A1 | 7/2010 | Brown et al. |
| 2010/0257580 A1 | 10/2010 | Zhao |
| 2010/0275199 A1 | 10/2010 | Smith et al. |
| 2010/0287306 A1 | 11/2010 | Matsuda |
| 2011/0016467 A1 | 1/2011 | Kane |
| 2011/0022695 A1 | 1/2011 | Dalal et al. |
| 2011/0060859 A1 | 3/2011 | Shukla et al. |
| 2011/0072486 A1 | 3/2011 | Hadar et al. |
| 2011/0103259 A1 | 5/2011 | Aybay et al. |
| 2011/0113467 A1 | 5/2011 | Agarwal et al. |
| 2011/0134920 A1 | 6/2011 | Dyke |
| 2011/0219170 A1 | 9/2011 | Frost et al. |
| 2011/0225647 A1 | 9/2011 | Dilley et al. |
| 2011/0246637 A1 | 10/2011 | Murakami |
| 2012/0042138 A1 | 2/2012 | Eguchi et al. |
| 2012/0072909 A1 | 3/2012 | Malik et al. |
| 2012/0079478 A1 | 3/2012 | Galles et al. |
| 2012/0096459 A1 | 4/2012 | Miyazaki |
| 2012/0163388 A1 | 6/2012 | Goel et al. |
| 2012/0167082 A1 | 6/2012 | Kumar et al. |
| 2012/0207039 A1 | 8/2012 | Srinivasan et al. |

(56) References Cited

U.S. PATENT DOCUMENTS

| | | |
|---|---|---|
| 2012/0207174 A1 | 8/2012 | Shieh |
| 2012/0240182 A1 | 9/2012 | Narayanaswamy et al. |
| 2012/0259953 A1 | 10/2012 | Gertner |
| 2012/0278584 A1 | 11/2012 | Nagami et al. |
| 2012/0290703 A1 | 11/2012 | Barabash et al. |
| 2012/0320918 A1 | 12/2012 | Fomin et al. |
| 2013/0007740 A1 | 1/2013 | Kikuchi et al. |
| 2013/0033993 A1 | 2/2013 | Cardona et al. |
| 2013/0044631 A1 | 2/2013 | Biswas et al. |
| 2013/0058346 A1 | 3/2013 | Sridharan et al. |
| 2013/0061047 A1 | 3/2013 | Sridharan et al. |
| 2013/0073702 A1 | 3/2013 | Umbehocker |
| 2013/0073743 A1 | 3/2013 | Ramasamy et al. |
| 2013/0125122 A1 | 5/2013 | Hansen |
| 2013/0125230 A1 | 5/2013 | Koponen et al. |
| 2013/0145106 A1 | 6/2013 | Kan |
| 2013/0163594 A1 | 6/2013 | Sharma et al. |
| 2013/0227097 A1 | 8/2013 | Yasuda et al. |
| 2013/0227550 A1 | 8/2013 | Weinstein et al. |
| 2013/0265883 A1 | 10/2013 | Henry et al. |
| 2013/0311663 A1 | 11/2013 | Kamath et al. |
| 2013/0318219 A1 | 11/2013 | Kancherla |
| 2013/0318268 A1 | 11/2013 | Dalal et al. |
| 2013/0332983 A1 | 12/2013 | Koorevaar et al. |
| 2013/0346583 A1 | 12/2013 | Low et al. |
| 2014/0003442 A1 | 1/2014 | Hernandez et al. |
| 2014/0056151 A1 | 2/2014 | Petrus et al. |
| 2014/0067763 A1 | 3/2014 | Jorapurkar et al. |
| 2014/0068602 A1 | 3/2014 | Gember et al. |
| 2014/0074799 A1 | 3/2014 | Karampuri et al. |
| 2014/0098815 A1 | 4/2014 | Mishra et al. |
| 2014/0115578 A1 | 4/2014 | Cooper et al. |
| 2014/0123211 A1 | 5/2014 | Wanser et al. |
| 2014/0164595 A1 | 6/2014 | Bray et al. |
| 2014/0195666 A1 | 7/2014 | Dumitriu et al. |
| 2014/0201305 A1 | 7/2014 | Dalal et al. |
| 2014/0208075 A1 | 7/2014 | McCormick, Jr. |
| 2014/0215036 A1 | 7/2014 | Elzur |
| 2014/0244983 A1 | 8/2014 | McDonald et al. |
| 2014/0245296 A1 | 8/2014 | Sethuramalingam et al. |
| 2014/0245423 A1 | 8/2014 | Lee |
| 2014/0269712 A1 | 9/2014 | Kidambi |
| 2014/0269754 A1 | 9/2014 | Eguchi et al. |
| 2014/0281030 A1 | 9/2014 | Cui et al. |
| 2014/0282855 A1 | 9/2014 | Clark et al. |
| 2014/0330977 A1 | 11/2014 | Bemmel |
| 2014/0373148 A1 | 12/2014 | Nelms et al. |
| 2014/0376367 A1 | 12/2014 | Jain et al. |
| 2015/0007317 A1 | 1/2015 | Jain |
| 2015/0016300 A1 | 1/2015 | Devireddy et al. |
| 2015/0019748 A1 | 1/2015 | Gross, IV et al. |
| 2015/0020067 A1 | 1/2015 | Brant et al. |
| 2015/0033222 A1 | 1/2015 | Hussain et al. |
| 2015/0052280 A1 | 2/2015 | Lawson |
| 2015/0082417 A1 | 3/2015 | Bhagwat et al. |
| 2015/0117445 A1 | 4/2015 | Koponen et al. |
| 2015/0156250 A1 | 6/2015 | Varshney et al. |
| 2015/0172183 A1 | 6/2015 | DeCusatis et al. |
| 2015/0200808 A1 | 7/2015 | Gourlay et al. |
| 2015/0212892 A1 | 7/2015 | Li et al. |
| 2015/0215207 A1 | 7/2015 | Qin et al. |
| 2015/0222547 A1 | 8/2015 | Hayut et al. |
| 2015/0237013 A1 | 8/2015 | Bansal et al. |
| 2015/0242134 A1 | 8/2015 | Takada et al. |
| 2015/0261556 A1 | 9/2015 | Jain et al. |
| 2015/0261720 A1 | 9/2015 | Kagan et al. |
| 2015/0281178 A1 | 10/2015 | Raman et al. |
| 2015/0281179 A1 | 10/2015 | Raman et al. |
| 2015/0326532 A1 | 11/2015 | Grant et al. |
| 2015/0347231 A1 | 12/2015 | Gopal et al. |
| 2015/0358288 A1 | 12/2015 | Jain et al. |
| 2015/0358290 A1 | 12/2015 | Jain et al. |
| 2015/0381494 A1 | 12/2015 | Cherian et al. |
| 2015/0381495 A1 | 12/2015 | Cherian et al. |
| 2016/0006696 A1 | 1/2016 | Donley et al. |
| 2016/0092108 A1 | 3/2016 | Karaje et al. |
| 2016/0134702 A1 | 5/2016 | Gertner |
| 2016/0142320 A1 | 5/2016 | Gyllenhammer et al. |
| 2016/0156591 A1 | 6/2016 | Zhou et al. |
| 2016/0162302 A1 | 6/2016 | Warszawski et al. |
| 2016/0162438 A1 | 6/2016 | Hussain et al. |
| 2016/0179579 A1 | 6/2016 | Amann et al. |
| 2016/0182342 A1 | 6/2016 | Singaravelu et al. |
| 2016/0239330 A1 | 8/2016 | Bride et al. |
| 2016/0285913 A1 | 9/2016 | Itskin et al. |
| 2016/0294858 A1 | 10/2016 | Woolward et al. |
| 2016/0306648 A1 | 10/2016 | Deguillard et al. |
| 2017/0005986 A1 | 1/2017 | Bansal et al. |
| 2017/0024334 A1 | 1/2017 | Bergsten et al. |
| 2017/0075845 A1 | 3/2017 | Kopparthi |
| 2017/0093623 A1 | 3/2017 | Zheng |
| 2017/0099532 A1 | 4/2017 | Kakande |
| 2017/0104790 A1 | 4/2017 | Meyers et al. |
| 2017/0118173 A1 | 4/2017 | Arramreddy et al. |
| 2017/0134433 A1 | 5/2017 | Hugenbruch et al. |
| 2017/0161090 A1 | 6/2017 | Kodama |
| 2017/0161189 A1 | 6/2017 | Gertner |
| 2017/0180273 A1 | 6/2017 | Daly et al. |
| 2017/0180414 A1 | 6/2017 | Andrews et al. |
| 2017/0180477 A1* | 6/2017 | Hashimoto ......... G06F 12/0246 |
| 2017/0187679 A1 | 6/2017 | Basak et al. |
| 2017/0195454 A1 | 7/2017 | Shieh |
| 2017/0208100 A1 | 7/2017 | Lian et al. |
| 2017/0214549 A1 | 7/2017 | Yoshino et al. |
| 2017/0244671 A1 | 8/2017 | Kamalakantha et al. |
| 2017/0244673 A1 | 8/2017 | Han |
| 2017/0244674 A1 | 8/2017 | Han |
| 2017/0264622 A1 | 9/2017 | Cooper et al. |
| 2017/0295033 A1 | 10/2017 | Cherian et al. |
| 2018/0024775 A1 | 1/2018 | Miller |
| 2018/0024964 A1 | 1/2018 | Mao et al. |
| 2018/0032249 A1 | 2/2018 | Makhervaks et al. |
| 2018/0088978 A1 | 3/2018 | Li et al. |
| 2018/0095872 A1 | 4/2018 | Dreier et al. |
| 2018/0097778 A1 | 4/2018 | Jain et al. |
| 2018/0109471 A1 | 4/2018 | Chang et al. |
| 2018/0131633 A1* | 5/2018 | Li ..................... H04L 47/821 |
| 2018/0152540 A1 | 5/2018 | Niell et al. |
| 2018/0203719 A1 | 7/2018 | Zhang et al. |
| 2018/0260125 A1 | 9/2018 | Botes et al. |
| 2018/0262599 A1 | 9/2018 | Firestone |
| 2018/0278684 A1 | 9/2018 | Rashid et al. |
| 2018/0309641 A1 | 10/2018 | Wang et al. |
| 2018/0309718 A1 | 10/2018 | Zuo |
| 2018/0329743 A1 | 11/2018 | Pope et al. |
| 2018/0331976 A1 | 11/2018 | Pope et al. |
| 2018/0336346 A1 | 11/2018 | Guenther |
| 2018/0337991 A1 | 11/2018 | Kumar et al. |
| 2018/0349037 A1 | 12/2018 | Zhao et al. |
| 2018/0359215 A1 | 12/2018 | Khare et al. |
| 2019/0042506 A1 | 2/2019 | Devey et al. |
| 2019/0044809 A1 | 2/2019 | Willis et al. |
| 2019/0044866 A1 | 2/2019 | Chilikin et al. |
| 2019/0065526 A1* | 2/2019 | Ribeiro ............... G06F 16/183 |
| 2019/0075063 A1 | 3/2019 | McDonnell et al. |
| 2019/0132296 A1 | 5/2019 | Jiang et al. |
| 2019/0158396 A1 | 5/2019 | Yu et al. |
| 2019/0173689 A1 | 6/2019 | Cherian et al. |
| 2019/0200105 A1 | 6/2019 | Cheng et al. |
| 2019/0235909 A1 | 8/2019 | Jin et al. |
| 2019/0278675 A1 | 9/2019 | Bolkhovitin et al. |
| 2019/0280980 A1 | 9/2019 | Hyoudou |
| 2019/0286373 A1 | 9/2019 | Karumbunathan et al. |
| 2019/0306083 A1 | 10/2019 | Shih et al. |
| 2020/0021532 A1 | 1/2020 | Borikar et al. |
| 2020/0028800 A1 | 1/2020 | Strathman et al. |
| 2020/0042234 A1 | 2/2020 | Krasner et al. |
| 2020/0042389 A1 | 2/2020 | Kulkarni et al. |
| 2020/0042412 A1 | 2/2020 | Kulkarni et al. |
| 2020/0133909 A1 | 4/2020 | Hefty et al. |
| 2020/0136996 A1 | 4/2020 | Li et al. |
| 2020/0213227 A1 | 7/2020 | Pianigiani et al. |
| 2020/0259731 A1 | 8/2020 | Sivaraman et al. |
| 2020/0278892 A1 | 9/2020 | Nainar et al. |

(56) References Cited

U.S. PATENT DOCUMENTS

| | | |
|---|---|---|
| 2020/0278893 A1 | 9/2020 | Niell et al. |
| 2020/0314011 A1 | 10/2020 | Deval et al. |
| 2020/0319812 A1 | 10/2020 | He et al. |
| 2020/0328192 A1 | 10/2020 | Zaman et al. |
| 2020/0334195 A1* | 10/2020 | Chen ................. H04L 47/34 |
| 2020/0382329 A1 | 12/2020 | Yuan |
| 2020/0401320 A1 | 12/2020 | Pyati et al. |
| 2020/0412659 A1 | 12/2020 | Ilitzky et al. |
| 2021/0019270 A1 | 1/2021 | Li et al. |
| 2021/0026670 A1 | 1/2021 | Krivenok et al. |
| 2021/0058342 A1 | 2/2021 | McBrearty |
| 2021/0176212 A1 | 6/2021 | Han |
| 2021/0226846 A1 | 7/2021 | Ballard et al. |
| 2021/0232528 A1 | 7/2021 | Kutch et al. |
| 2021/0266259 A1 | 8/2021 | Renner, III et al. |
| 2021/0273911 A1 | 9/2021 | Jain et al. |
| 2021/0314232 A1 | 10/2021 | Nainar et al. |
| 2021/0357242 A1 | 11/2021 | Ballard et al. |
| 2021/0377166 A1 | 12/2021 | Brar et al. |
| 2021/0377188 A1 | 12/2021 | Ghag et al. |
| 2021/0392017 A1 | 12/2021 | Cherian et al. |
| 2021/0409317 A1 | 12/2021 | Seshan et al. |
| 2022/0027147 A1 | 1/2022 | Maddukuri et al. |
| 2022/0043572 A1 | 2/2022 | Said et al. |
| 2022/0100432 A1 | 3/2022 | Kim et al. |
| 2022/0100491 A1 | 3/2022 | Voltz et al. |
| 2022/0100542 A1 | 3/2022 | Voltz |
| 2022/0100544 A1 | 3/2022 | Voltz |
| 2022/0100545 A1 | 3/2022 | Cherian et al. |
| 2022/0100546 A1 | 3/2022 | Cherian et al. |
| 2022/0103478 A1 | 3/2022 | Ang et al. |
| 2022/0103487 A1 | 3/2022 | Ang et al. |
| 2022/0103488 A1 | 3/2022 | Wang et al. |
| 2022/0103490 A1 | 3/2022 | Kim et al. |
| 2022/0103629 A1 | 3/2022 | Cherian et al. |
| 2022/0150055 A1 | 5/2022 | Cui et al. |
| 2022/0164451 A1 | 5/2022 | Bagwell |
| 2022/0197681 A1 | 6/2022 | Rajagopal |
| 2022/0206908 A1 | 6/2022 | Brar et al. |
| 2022/0206962 A1 | 6/2022 | Kim et al. |
| 2022/0206964 A1 | 6/2022 | Kim et al. |
| 2022/0210229 A1 | 6/2022 | Maddukuri et al. |
| 2022/0231968 A1 | 7/2022 | Rajagopal |
| 2022/0272039 A1 | 8/2022 | Cardona et al. |
| 2022/0335563 A1 | 10/2022 | Elzur |
| 2023/0004508 A1 | 1/2023 | Liu et al. |
| 2023/0195488 A1 | 6/2023 | Ang et al. |
| 2023/0195675 A1 | 6/2023 | Ang et al. |
| 2023/0198833 A1 | 6/2023 | Ang et al. |

FOREIGN PATENT DOCUMENTS

| | | |
|---|---|---|
| CN | 101258725 A | 9/2008 |
| CN | 101540826 A | 9/2009 |
| DE | 102018004046 A1 | 11/2018 |
| EP | 1482711 A2 | 12/2004 |
| EP | 2748750 A1 | 7/2014 |
| EP | 3598291 A1 | 1/2020 |
| EP | 4160424 A2 | 4/2023 |
| TW | 202107297 A | 2/2021 |
| WO | 2005099201 A2 | 10/2005 |
| WO | 2007036372 A1 | 4/2007 |
| WO | 2008095010 A1 | 8/2008 |
| WO | 2010008984 A2 | 1/2010 |
| WO | 2013074828 A1 | 5/2013 |
| WO | 2015187201 A1 | 12/2015 |
| WO | 2016003489 A1 | 1/2016 |
| WO | 2020027913 A1 | 2/2020 |
| WO | 2020211071 A1 | 10/2020 |
| WO | 2021030020 A1 | 2/2021 |
| WO | 2022066267 A1 | 3/2022 |
| WO | 2022066268 A1 | 3/2022 |
| WO | 2022066270 A1 | 3/2022 |
| WO | 2022066271 A1 | 3/2022 |
| WO | 2022066531 A1 | 3/2022 |
| WO | 2023121720 A1 | 6/2023 |

OTHER PUBLICATIONS

Author Unknown, "8.6 Receive-Side Scaling (RSS)," Month Unknown 2020, 2 pages, Red Hat, Inc.

Author Unknown, "An Introduction to SmartNICs" The Next Platform, Mar. 4, 2019, 4 pages, retrieved from https://www.nextplatform.com/2019/03/04/an-introduction-to-smartnics/.

Author Unknown, "In-Hardware Storage Virtualization—NVMe SNAP™ Revolutionizes Data Center Storage: Composable Storage Made Simple," Month Unknown 2019, 3 pages, Mellanox Technologies, Sunnyvale, CA, USA.

Author Unknown, "Package Manager," Wikipedia, Sep. 8, 2020, 10 pages.

Author Unknown, "VMDK", Wikipedia, May 17, 2020, 3 pages, retrieved from https://en.wikipedia.org/w/index.php?title=VMDK&oldid=957225521.

Author Unknown, "vSAN Planning and Deployment" Update 3, Aug. 20, 2019, 85 pages, VMware, Inc., Palo Alto, CA, USA.

Author Unknown, "vSphere Managed Inventory Objects," Aug. 3, 2020, 3 pages, retrieved from https://docs.vmware.com/en/VMware-vSphere/6.7/com.vmware.vsphere.vcenterhost.doc/GUID-4D4B3DF2-D033-4782-A030-3C3600DE5A7F.html, VMware, Inc.

Author Unknown, "What is End-to-End Encryption and How does it Work?," Mar. 7, 2018, 4 pages, Proton Technologies AG, Geneva, Switzerland.

Author Unknown, "Network Functions Virtualisation; Infrastructure Architecture; Architecture of the Hypervisor Domain," Draft ETSI GS NFV-INF 004 V0.3.1, May 28, 2014, 50 pages, France.

Grant, Stewart, et al., "SmartNIC Performance Isolation with FairNIC: Programmable Networking for the Cloud," SIGCOMM '20, Aug. 10-14, 2020, 13 pages, ACM, Virtual Event, USA.

Harris, Jim, "Accelerating NVME-oF* for VMs with the Storage Performance Development Kit," Flash Memory Summit, Aug. 2017, 18 pages, Intel Corporation, Santa Clara, CA.

Herbert, Tom, et al., "Scaling in the Linux Networking Stack," Jun. 2, 2020, 9 pages, retrieved from https://01.org/inuxgraphics/gfx-docs/drm/networking/scaling.html.

Koponen, Teemu, et al., "Network Virtualization in Multi-tenant Datacenters," Technical Report TR-2013-001E, Aug. 2013, 22 pages, VMware, Inc., Palo Alto, CA, USA.

Le Vasseur, Joshua, et al., "Standardized but Flexible I/O for Self-Virtualizing Devices," Month Unknown 2008, 7 pages.

Liu, Ming, et al., "Offloading Distributed Applications onto SmartNICs using iPipe," SIGCOMM '19, Aug. 19-23, 2019, 16 pages, ACM, Beijing, China.

Non-Published Commonly Owned U.S. Appl. No. 17/560,142, filed Dec. 22, 2021, 60 pages, VMware, Inc.

Non-Published Commonly Owned U.S. Appl. No. 17/560,148, filed Dec. 22, 2021, 59 pages, VMware, Inc.

Non-Published Commonly Owned U.S. Appl. No. 17/560,153, filed Dec. 22, 2021, 59 pages, VMware, Inc.

Non-Published Commonly Owned U.S. Appl. No. 17/826,911, filed May 27, 2022, 29 pages, VMware, Inc.

Non-Published Commonly Owned U.S. Appl. No. 17/845,658, filed Jun. 21, 2022, 39 pages, VMware, Inc.

Non-Published Commonly Owned U.S. Appl. No. 17/845,661, filed Jun. 21, 2022, 39 pages, VMware, Inc.

Non-Published Commonly Owned U.S. Appl. No. 17/845,740, filed Jun. 21, 2022, 31 pages, VMware, Inc.

Perlroth, Nicole, "What is End-to-End Encryption? Another Bull's-Eye on Big Tech," The New York Times, Nov. 19, 2019, 4 pages, retrieved from https://nytimes.com/2019/11/19/technology/end-to-end-encryption.html.

Peterson, Larry L., et al., "OS Support for General-Purpose Routers," Month Unknown 1999, 6 pages, Department of Computer Science, Princeton University.

(56) References Cited

OTHER PUBLICATIONS

Pettit, Justin, et al., "Virtual Switching in an Era of Advanced Edges," In Proc. 2nd Workshop on Data Center—Converged and Virtual Ethernet Switching (DCCAVES), Sep. 2010, 7 pages, vol. 22. ITC.
Spalink, Tammo, et al., "Building a Robust Software-Based Router Using Network Processors," Month Unknown 2001, 14 pages, ACM, Banff, Canada.
Stringer, Joe, et al., "OVS Hardware Offloads Discussion Panel," Nov. 7, 2016, 37 pages, retrieved from http://openvswitch.org/support/ovscon2016/7/1450-stringer.pdf.
Suarez, Julio, "Reduce TCO with Arm Based SmartNICs," Nov. 14, 2019, 12 pages, retrieved from https://community.arm.com/arm-community-blogs/b/architectures-and-processors-blog/posts/reduce-tco-with-arm-based-smartnics.
Turner, Jon, et al., "Supercharging PlanetLab—High Performance, Multi-Application Overlay Network Platform," SIGCOMM-07, Aug. 27-31, 2007, 12 pages, ACM, Koyoto, Japan.
Angeles, Sara, "Cloud vs. Data Center: What's the difference?" Nov. 23, 2018, 1 page, retrieved from https://www.businessnewsdaily.com/4982-cloud-vs-data-center.html.
Author Unknown, "Middlebox," Wikipedia, Nov. 19, 2019, 1 page, Wikipedia.com.
Doyle, Lee, "An Introduction to smart NICs and their Benefits," Jul. 2019, 2 pages, retrieved from https://www.techtarget.com/searchnetworking/tip/An-introduction-to-smart-NICs-and-ther-benefits.
Non-Published Commonly Owned U.S. Appl. No. 18/196,844, filed May 12, 2023, 41 pages, Nicira, Inc.
Author Unknown, "CISCO Identity-Based Firewall Security," Month Unknown 2011, 2 pages, CISCO Systems, Inc.
Author Unknown, "Hypervisor," Aug. 13, 2020, 1 page, VMware.com.
Author Unknown, "Transparent," Free On-Line Dictionary of Computing (FOLDOC), Jun. 6, 1996, 1 page, retrieved from http://foldoc.org/transparent.
Author Unknown, "AppLogic Features," Jul. 2007, 2 pages, 3TERA, Inc.
Author Unknown, "Enabling Service Chaining on Cisco Nexus 1000V Series," Month Unknown, 2012, 25 pages, CISCO.
Author Unknown, "Next-Generation Firewalls," Month Unknown 2013, 1 page, Palo Alto Networks.
Basak, Debashis, et al., "Virtualizing Networking and Security in the Cloud," Month Unknown 2010, 9 pages, VMware, Inc., Palo Alto, CA.
Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.
Dixon, Colin, et al., "An End to the Middle," Proceedings of the 12th Conference on Hot Topics in Operating Systems, May 2009, 5 pages, USENIX Association, Berkeley, CA, USA.
Dumitriu, Dan Mihai, et al., (U.S. Appl. No. 61/514,990), filed Aug. 4, 2011, 31 pages.
Guichard, J., et al., "Network Service Chaining Problem Statement," Network Working Group, Jun. 13, 2013, 14 pages, Cisco Systems, Inc.
Ioannidis, Sotiris, et al., "Implementing a Distributed Firewall," CCS '00, Month Unknown 2000, 10 pages, ACM, Athens, Greece.
Joseph, Dilip Anthony, et al., "A Policy-aware Switching Layer for Data Centers," Jun. 24, 2008, 26 pages, Electrical Engineering and Computer Sciences, University of California, Berkeley, CA, USA.
Li, Junnan, et al., "DrawerPipe: A Reconfigurable Pipeline for Network Processing on FGPA-Based SmartNIC," Electronics 2020, Dec. 10, 2019, 24 pages, retrieved from https://www.mdpi.com/2079-9292/9/1/59.
Litvak, Michail, "Linux—IP-RULE(8): Routing Policy Database Management," Apr. 10, 2014, 5 pages, retrieved from https://man7.org/linux/man-pages/man8/ip-rule.8.html.
Mohammadkhan, Ali, et al., "P4NFV: P4 Enabled NFV Systems with SmartNICs," 2019 IEEE Conference on Network Function Virtualization and Software Defined Networks (NFV-SDN), Nov. 12-14, 2019, 7 pages, IEEE, Dallas, TX, USA.
Non-Published Commonly Owned U.S. Appl. No. 18/226,775, filed Jul. 27, 2023, 63 pages, Nicira, Inc.
Non-Published Commonly Owned U.S. Appl. No. 18/235,860, filed Aug. 20, 2023, 58 pages, VMware, Inc.
Olds, Dan, "Os Virtualization vs. Hypervisor: Why You Should Offer Both," Oct. 19, 2008, 3 pages, techtarget.com.
Pagiamtzis, Kostas, et al., "Content-Addressable Memory (CAM) Circuits and Architectures: A Tutorial and Survey," IEEE Journal of Solid-State Circuits, Mar. 2006, 16 pages, vol. 41, No. 3.
Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.
Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.
Stojanovski, Nenad, et al., "Analysis of Identity Based Firewall Systems," Jun. 2010, 9 pages.
Stojanovski, Nenad, et al., "Architecture Of A Identity Based Firewall System," Jul. 2011, 9 pages.

* cited by examiner

SMART NIC RESPONDING TO REQUESTS FROM CLIENT DEVICE

BACKGROUND

Especially in the datacenter context, programmable smart network interface controllers (NICs) are becoming more commonplace. These smart NICs typically include a central processing unit (CPU), possibly in addition to one or more application-specific integrated circuits (ASICs) or field-programmable gate arrays (FPGAs). These ASICs (or FPGAs) can be designed for packet processing as well as other uses. However, the inclusion of the CPU also allows for more configurability of the smart NICs, thereby enabling the offloading of some tasks from software of a host computer.

BRIEF SUMMARY

Some embodiments provide a network interface controller (NIC) that translates file identifiers in client requests into local memory locations in order to transmit files to client devices in response to the client requests. The NIC, in some embodiments, is a smart NIC that includes at least a configurable processor for more than simply performing basic I/O data message handling. The NIC is configured to translate an identifier in a client request (e.g., a file name or other virtual identifier) into a memory location of a specific storage device. The NIC then reads the data for the file from the memory location and transmits the requested file data from the memory location to the client device.

The NIC, in some embodiments, is the network interface for a computer that operates as a server, having one or more storage devices that store files which can be requested by clients. In some embodiments, the storage devices can include a set of one or more non-volatile memory express (NVMe) storage devices connected to the NIC. In some embodiments, the NIC accesses these NVMe devices directly, without communicating with the CPU of the computer. The storage devices may also include memory or a hard disk associated with the CPU as well as memory of the NIC itself, in some embodiments. In other embodiments, the computer does not actually include a full-scale CPU (i.e., an x86 or ARM CPU), but instead only includes a processor that can boot up the system, the NIC configured to perform file identifier translation, and a set of NVMe devices storing the files. In other embodiments, the computer includes a CPU that executes a network stack to manage connections (e.g., TCP connections) with clients.

In some embodiments, a client device sends a request as a data message that stores the identifier for the file and, in some cases, an offset that indicates a specific portion of the particular file (e.g., a timestamp for media content). Upon receipt of the request, the NIC maps the file identifier to one of its connected storage devices and a memory location within that storage device. In addition, the NIC uses the offset (if present) to identify a memory location for the requested starting point in the file. The NIC can read the data from this starting point and transmit the data to the client device. Typically, the transmission of the data requires numerous data messages, depending on the amount of data to be transmitted.

The computer, as mentioned, operates as a server in some embodiments. For instance, the computer is one of numerous computers operating within a datacenter to provide data in response to client requests for a service (e.g., providing media content to customers of a streaming service). Each of the computers (or at least a subset of the computers) includes its own set of storage devices, which store data files provided by the service. Each file can be stored on multiple computers, with the NIC of each computer having its own translation table (i.e., so that the files need not be organized in exactly the same manner on each computer's storage devices). When a request is received at the datacenter, a load balancer (e.g., a separate NIC operating at a load balancer computer) uses the file identifier in the request to forward the data message to one of the computers that stores the requested file. The NIC at the computer that receives the request can then service the request and provide the requested file data.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a network interface controller (NIC) that translates file identifiers in client requests into local memory locations in order to transmit files to client devices in response to the client requests. The NIC, in some embodiments, is a smart NIC that includes at least a configurable processor for more than simply performing basic I/O data message handling. The NIC is configured to translate an identifier in a client request (e.g., a file name or other virtual identifier) into a memory location of a specific storage device. The NIC then reads the data for the file from the memory location and transmits the requested file data from the memory location to the client device.

The NIC, in some embodiments, is the network interface for a computer that operates as a server, having one or more storage devices that store files which can be requested by clients. In some embodiments, the storage devices can include a set of one or more non-volatile memory express (NVMe) storage devices connected to the NIC. In some embodiments, the NIC accesses these NVMe devices directly, without communicating with the CPU of the computer. The storage devices may also include memory or a hard disk associated with the CPU as well as memory of the NIC itself, in some embodiments. In other embodiments, the computer does not actually include a full-scale CPU (i.e., an x86 or ARM CPU), but instead only includes a processor that can boot up the system, the NIC configured to perform file identifier translation, and a set of NVMe devices storing the files. In other embodiments, the computer includes a CPU that executes a network stack to manage connections (e.g., TCP connections) with clients.

Figure 1:
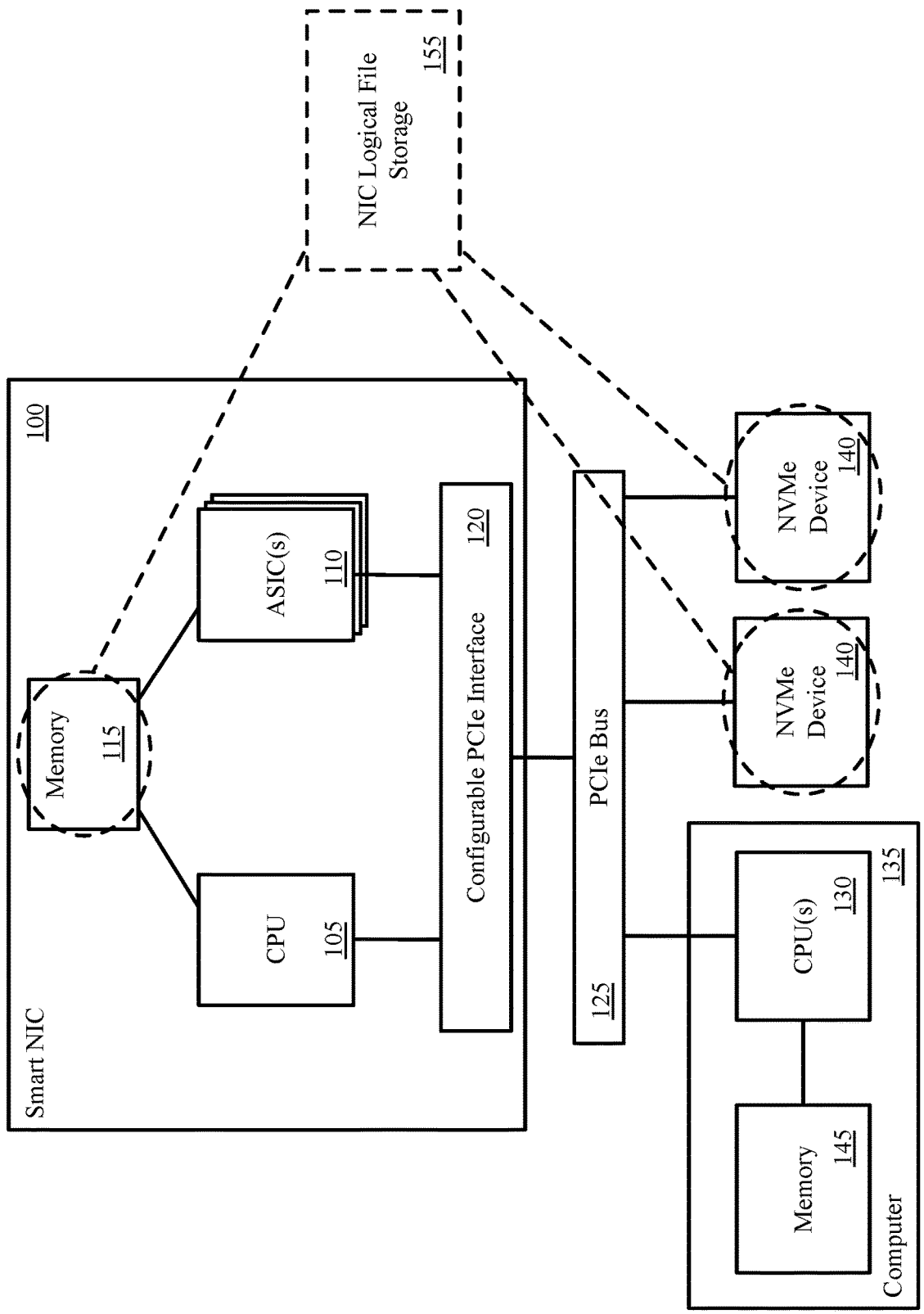
FIG. 1 conceptually illustrates the hardware of a smart NIC of some embodiments that can be configured to translate file identifiers into memory addresses for a particular device in order to service client requests.

FIG. 1 conceptually illustrates the hardware of a smart NIC 100 of some embodiments that can be configured to translate file identifiers into memory addresses for a particular device in order to service client requests. As shown, the smart NIC 100 includes its own general-purpose (e.g., x86 or ARM) CPU 105, a set of application-specific integrated circuit (ASICs) 110, memory 115, and a configurable PCIe interface 120. The ASICs 110, in some embodiments, include at least one I/O ASIC that handles the processing of data messages forwarded to and from the computer (e.g., performing forwarding according to a set of forwarding entries). In some embodiments, these ASICs 110 are at least partly controlled by the CPU 105. In some embodiments, either in addition to or as an alternative to the ASICs, the smart NIC may include a set of configurable field-programmable gate arrays (FPGAs). It should be noted that, in some embodiments, the CPU is a lightweight processor (e.g., not an ARM or x86 processor) that only functions to perform file identifier to memory address translation. In other embodiments, the NIC 100 does not include a general-purpose processor at all and instead an ASIC or FPGA is configured to perform the file identifier to memory address translation.

The configurable PCIe interface 120 enables connection of the smart NIC 100 to the other physical components of a computer system via a PCIe bus 125 of the computer system. Via this configurable PCIe interface 120, the smart NIC 100 can present itself to the computer system as a multitude of devices, including a data message processing NIC, a hard disk (using non-volatile memory express (NVMe) over PCIe), or other types of devices. As shown, also connected to the PCIe bus 125 is (i) a set of CPU(s) 130 of a host computer 135 and a set of NVMe devices 140. In this case, the computer includes two NVMe devices 140, but it should be understood that any number of such storage devices (including other types of storage devices) are possible for storing data to service client requests.

The host computer 135 includes at least a set of CPUs 130 (e.g., a single processor, a multi-core processor, etc.) and a memory (e.g., one or more random access memories) 145. In different embodiments, the host computer 135 may be a bare metal (i.e., non-virtualized) computing device or may operate a set of virtualized data compute nodes (e.g., containers, virtual machines, etc.). The host computer CPU 130 of some embodiments executes a network stack in some embodiments as well as various other processes (e.g., operating system, hypervisor, applications, etc.), making use of the memory 145. In some embodiments, the host computer network stack manages connections (e.g., TCP connections) with clients that request data (while the smart NIC 100 manages the actual data transfer to the clients).

The NVMe devices 140 connect to the host computer 135 as well as the smart NIC 100 via the PCIe bus 125. The NVMe devices 140 can be used as storage (e.g., disk storage) for the system. For instance, in some embodiments the NVMe devices 140 store files that the smart NIC 100 uses to service client requests. In some embodiments, the NIC 100 is configured to access data spanning its own memory 115 as well as the NVMe devices 140 (and in some cases also the memory 145 of the computer 135). These different storages are combined to form a NIC logical file storage 155, with the NIC able to translate file identifiers from client requests into physical or virtual memory locations in these various storage components. In some embodiments, the logical file storage 155 can include additional physical (or virtual) memory devices (e.g., other types of disk storage). In some embodiments, the NIC logical file storage 155 may even include devices accessible via a network (e.g., NVMe devices accessible via NVMe over fabric protocols).

Figure 2:
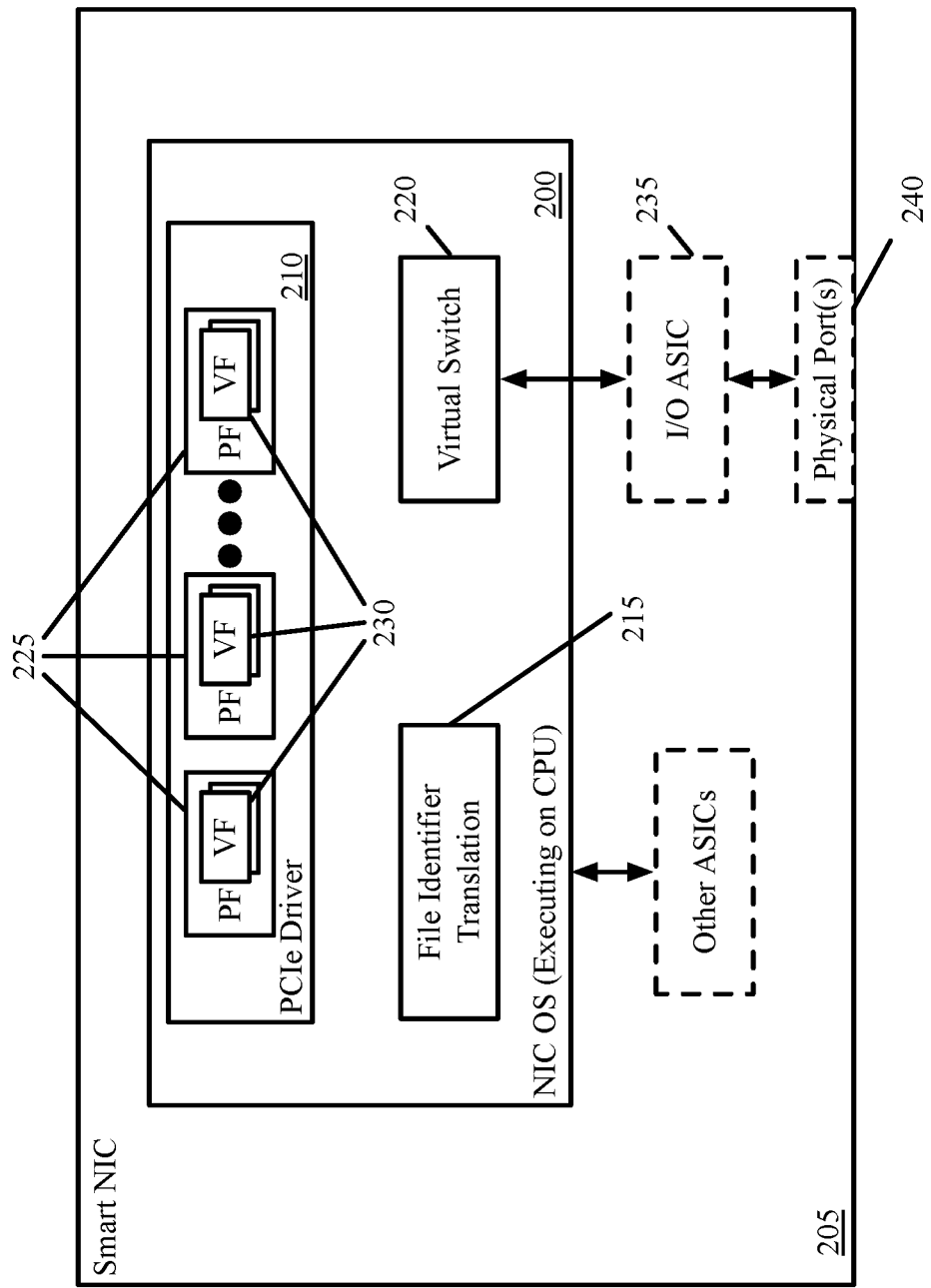
FIG. 2 conceptually illustrates the NIC operating system of a smart NIC of some embodiments.

In some embodiments, the CPU 105 of the smart NIC 100 executes a NIC operating system (OS) that controls the ASICs 110 and can perform other operations as well, including file identifier to memory address translation. FIG. 2 conceptually illustrates the NIC OS 200 of a smart NIC 205 of some embodiments. The NIC OS 200 is executed, in some embodiments, by the CPU of the smart NIC (e.g., CPU 105). This NIC OS 200 includes a PCIe driver 210, a virtual switch 220, and other functions 215.

The PCIe driver 210 includes multiple physical functions 225, each of which is capable of instantiating multiple virtual functions 230. These different physical functions 225 enable the smart NIC 205 to present as multiple different types of devices to the computer system to which it attaches via its PCIe bus. For instance, the smart NIC 205 can present itself as a network adapter (for processing data messages to and from the computer system) as well as an NVMe disk in some embodiments.

The NIC OS 200 of some embodiments is capable of executing a virtualization program (similar to a hypervisor) that enables sharing resources (e.g., memory, CPU resources) of the smart NIC 205 among multiple machines (e.g., VMs) if those VMs execute on the computer. The virtualization program can provide compute virtualization services and/or network virtualization services similar to a managed hypervisor in some embodiments. These network virtualization services, in some embodiments, include segregating data messages into different private (e.g., overlay) networks that are defined over the physical network (shared between the private networks), forwarding the data messages for these private networks (e.g., performing switching and/or routing operations), and/or performing middlebox services for the private networks.

To implement these network virtualization services, the NIC OS 200 of some embodiments executes the virtual switch 220. The virtual switch 220 enables the smart NIC 205 to perform software-defined networking and provide the I/O ASIC 235 of the smart NIC 205 with a set of flow entries (e.g., the cache entries described herein) so that the I/O ASIC 235 can perform flow processing offload (FPO) for the computer system in some embodiments. The I/O ASIC 235, in some embodiments, receives data messages from the network and transmits data messages to the network via one or more physical network ports 240.

The file identifier translation function 215 executed by the NIC operating system 200 of some embodiments translates between file identifiers (e.g., in client request messages) and physical or virtual memory addresses of multiple devices, including the physical NIC memory and any number of NVMe devices. The NIC OS 200 can also include various other operations, including operations not directly related to data message processing (e.g., operations for a machine-learning system).

In other embodiments, as indicated above, the NIC does not run a full NIC OS. Instead, either a lightweight CPU (e.g., a non-x86/ARM processor) or an ASIC or FPGA is configured to perform the logical memory address translation. In this case, the NIC is also capable of performing typical I/O data message processing functions. In addition, some embodiments do not require a full-scale computer with an x86 or ARM CPU. Rather, some such embodiments essentially include a NIC configured to perform file identifier translation as well as a set of NVMe devices that store files for client requests.

Figure 3:
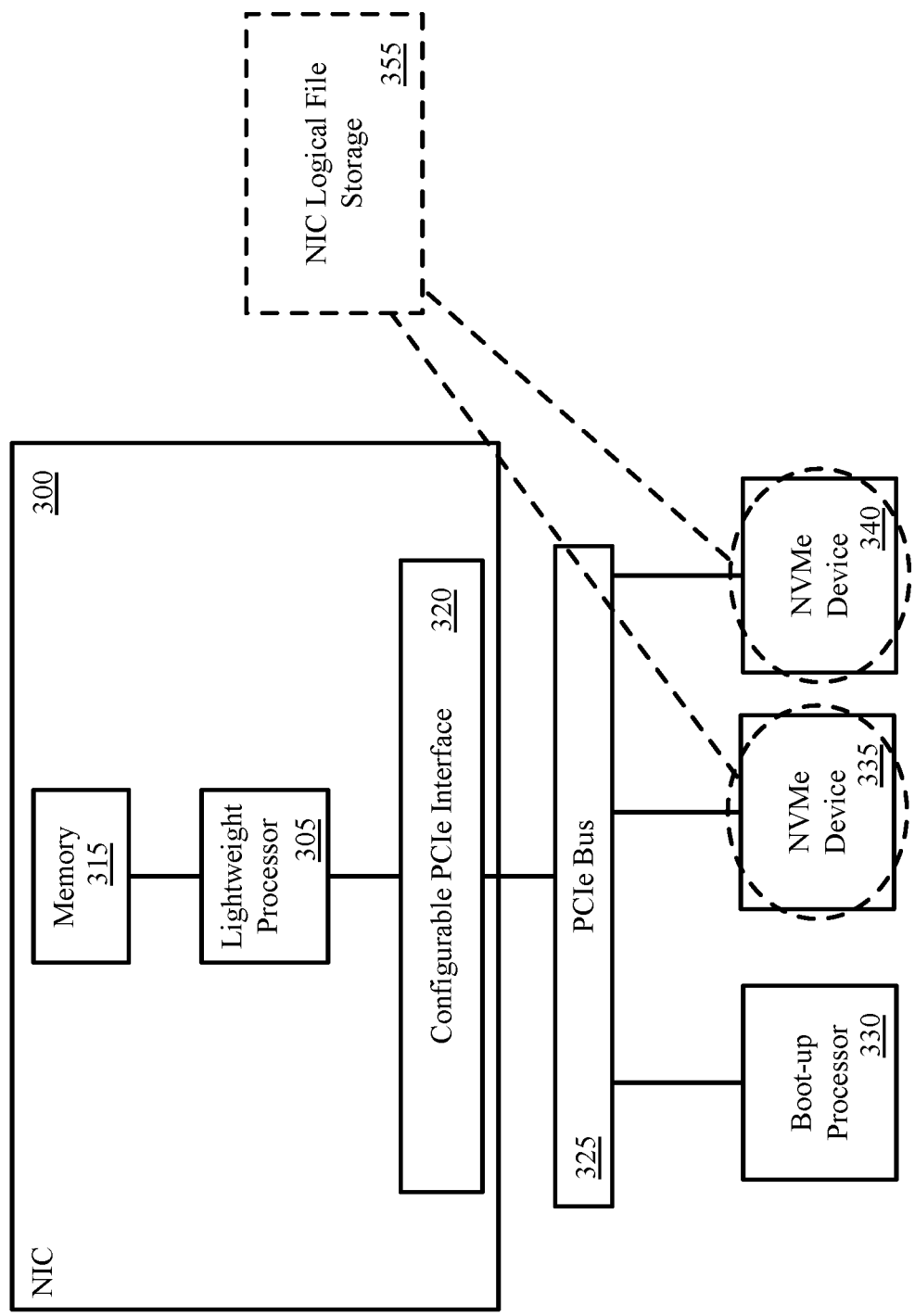
FIG. 3 conceptually illustrates a server system with a lightweight NIC connected to a boot-up processor and a set of NVMe devices.

FIG. 3 conceptually illustrates such a server system with a NIC 300 connected to a processor 330 and a set of NVMe devices 335 and 340. In this example, the NIC 300 includes a lightweight processor 305, a memory 315, and a configurable PCIe interface 320. The lightweight processor 305 can be a lightweight CPU, an ASIC, or an FPGA that is configured to service client requests by translating file identifiers in client request data messages into memory addresses of specific connected devices, read file data from the memory addresses, and transmit data messages to the requesting clients. In some embodiments, the NIC 300 also includes an I/O processor (e.g., an ASIC or FPGA) for handling the data message receipt and transmission. This may be a separate processor or a function also performed by the lightweight processor 305.

The memory 315, in some embodiments, stores a file identifier translation table used by the lightweight processor 305 to translate file identifiers into memory addresses, as further described below. As described above, the configurable PCIe interface 320 enables connection of the NIC 300 to the other physical components of a computer system via a PCIe bus 325 of the computer system. In this example, all of the file storage is in the two NVMe devices 335 and 340, which form a logical file storage 355 for the NIC 300 as described above by reference to FIG. 1.

The boot-up processor 330 is also a lightweight processor that does not perform any functions (or only performs minimal functions) once the system is running. Instead, the boot-up processor 330 is primarily responsible for booting up the computer system so that the NIC 300 can perform file identifier translation and transmit file data from the NVMe devices 335 and 340.

Figure 4:
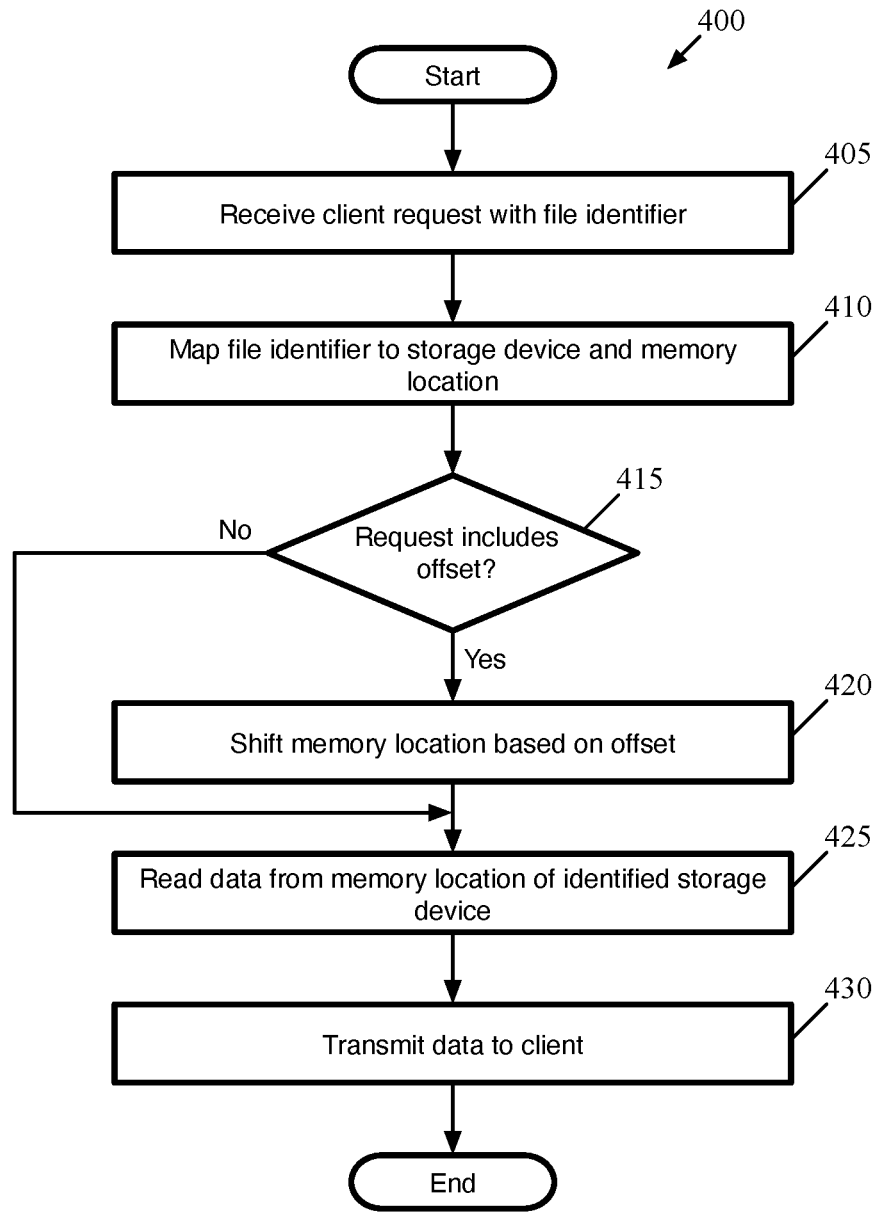
FIG. 4 conceptually illustrates a process of some embodiments for responding to client requests for file data by translating a file identifier in a client request into a memory location of a specific device.

FIG. 4 conceptually illustrates a process 400 of some embodiments for responding to client requests for file data by translating a file identifier in a client request into a memory location of a specific device. The process 400 is performed, in some embodiments, by a NIC such as that shown in FIG. 1 or FIG. 3. The process 400 will be described in part by reference to FIG. 5, which conceptually illustrates the use of a translation table by the NIC of some embodiments over two stages 505-510.

As shown, the process 400 begins by receiving (at 405) a client request that includes a file identifier. In some embodiments, a client device initiates a connection with the server (or with a front-end load balancer for a set of file servers in a datacenter) in order to send the request. The request itself is a TCP segment or similar format data message that includes the file identifier and, in some cases, an offset that indicates a specific portion of the particular file. For instance, in some embodiments the server is part of a streaming service (e.g., for streaming audio and/or video content to subscribers) and the request includes both a file identifier (specifying a particular piece of media content) and a timestamp (specifying a start time in the media content). In some embodiments, the NIC also extracts this file identifier (and any offset) from the received request.

The process 400 then maps (at 410) the file identifier to a storage device and memory location. As indicated, the server of some embodiments includes a NIC with multiple connected storage devices (e.g., multiple NVMe devices). The NIC uses a set of translation tables to map the file identifier to the device and location. In the first stage 505 of FIG. 5, a NIC 500 with three connected NVMe devices 515-525 receives a request 530. This request 530 is received as a TCP message that includes the file identifier "File2". The NIC 500 stores translation tables 535, which it uses to translate the file identifier received in the request 530 into a storage device and memory location.

The file translation tables 535 map file identifiers for files stored on the NVMe devices 515-525 to device identifiers as well as memory locations (i.e., memory addresses) on that device. Thus, the file identifier "File1" maps to a first location "Loc1" on the first storage device 515, the file identifier "File2" maps to a second location "Loc2" on that same storage device 515, the file identifier "File3" maps to a location "Loc3" on the second storage device 520, and so on for each file stored at this computer. As shown using bold text, the NIC 500 uses these translation tables 535 to map the received identifier "File2" to location "Loc2" on the first storage device 515.

Returning to FIG. 4, the process 400 determines (at 415) whether the received request includes an offset. If the entire file is requested, then the client may not send an offset with the request. Similarly, if the server belongs to a media streaming service, then if a client is viewing or listening to the content from the beginning, no offset may be sent with the request. However, if the client is, e.g., viewing a television episode or movie starting at a middle point of the content then this time offset may be included within the request.

When an offset is included, the process 400 shifts (at 420) the identified memory location based on this offset. If the offset is a timestamp in media content and the media content requires a known amount of storage per unit of time, the amount to shift based on the timestamp can be calculated. Other embodiments store additional information with the translation tables, such as memory locations for various timestamps within each piece of media content. For other types of content, the amount of memory to shift by may be calculated based on other information (e.g., using stored information indicating the total size of the requested file).

With the memory location from which to start determined (i.e., using either the starting memory location for the requested file or a shifted memory location based on a client-specified offset), the process 400 reads (at 425) data from this memory location of the identified storage device.

If the memory location refers to a location within an NVMe device (or a similar storage connected via the PCIe bus), the NIC reads this information directly from the device (via its PCIe interface) without the involvement of the CPU.

Figure 5:
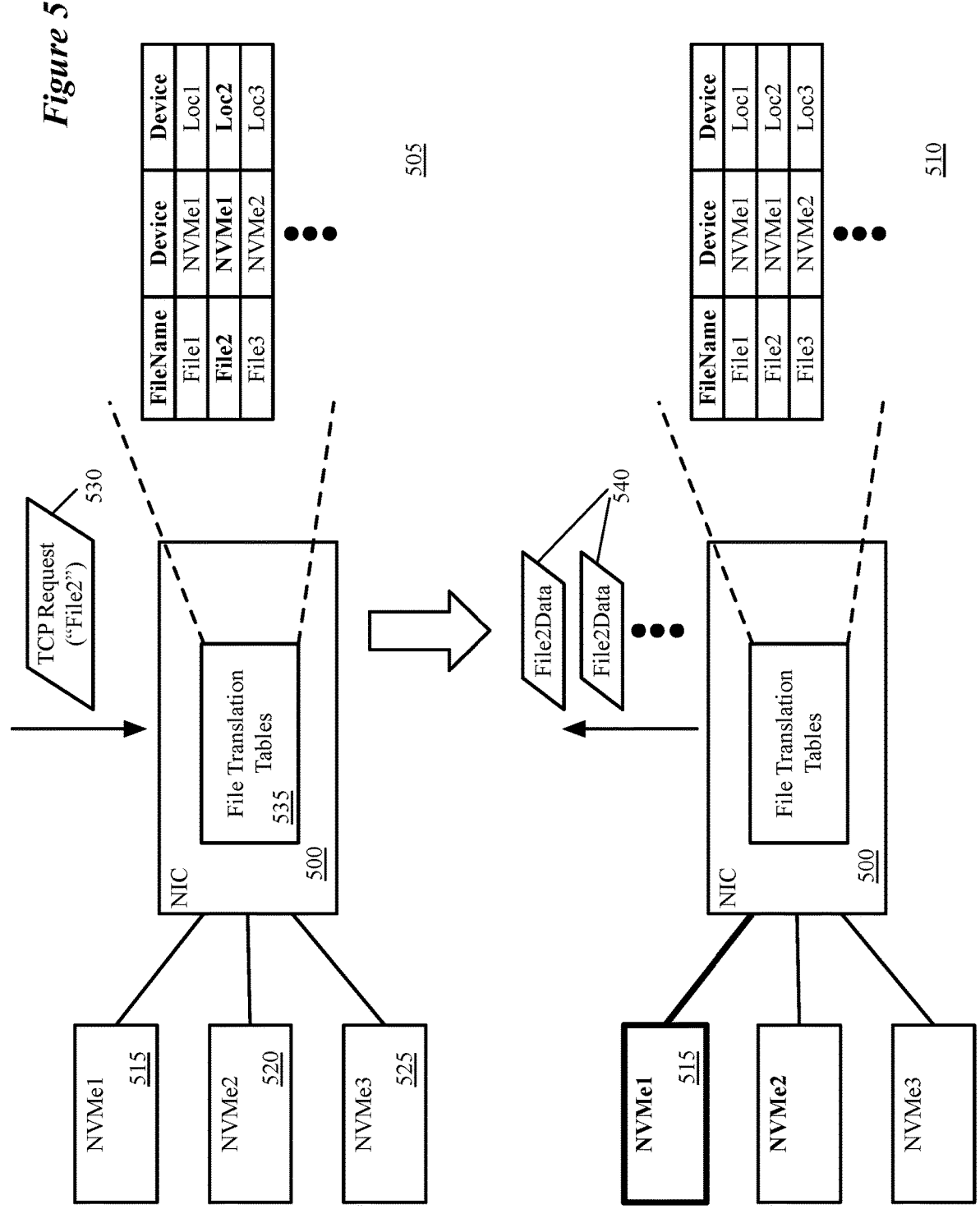
FIG. 5 conceptually illustrates the use of a translation table by a NIC of some embodiments.

Finally, the process 400 transmits (at 430) the data to the client, then ends. In some embodiments, the NIC sends numerous data messages in order to transmit the entire file to the client. In the case of streaming media content, the transmission of data may take place over a lengthy period of time. This data, in some embodiments, is transmitted as a set of TCP segments via the established network connection through which the client request was received. The second stage 510 of FIG. 5 shows that the NIC 500 reads data from the first storage device 515 (shown by the bolded lines) and transmits this data as a set of data messages 540.

As described, the computer operates as a server in some embodiments to provide data in response to client requests. In some embodiments, numerous such computers are located in a datacenter to all store data and provide that data to clients. For instance, a streaming service may have multiple such datacenters (e.g., in different geographic locations) to stream media content to subscribers. Within such a datacenter, each of the computers that operates as a server to provide data to clients includes its own set of connected storage devices (e.g., NVMe devices). In some such embodiments, each file (e.g., each piece of media content) may be stored on multiple computers (e.g., with content that is expected to be more popular stored on more of the computers).

Figure 6:
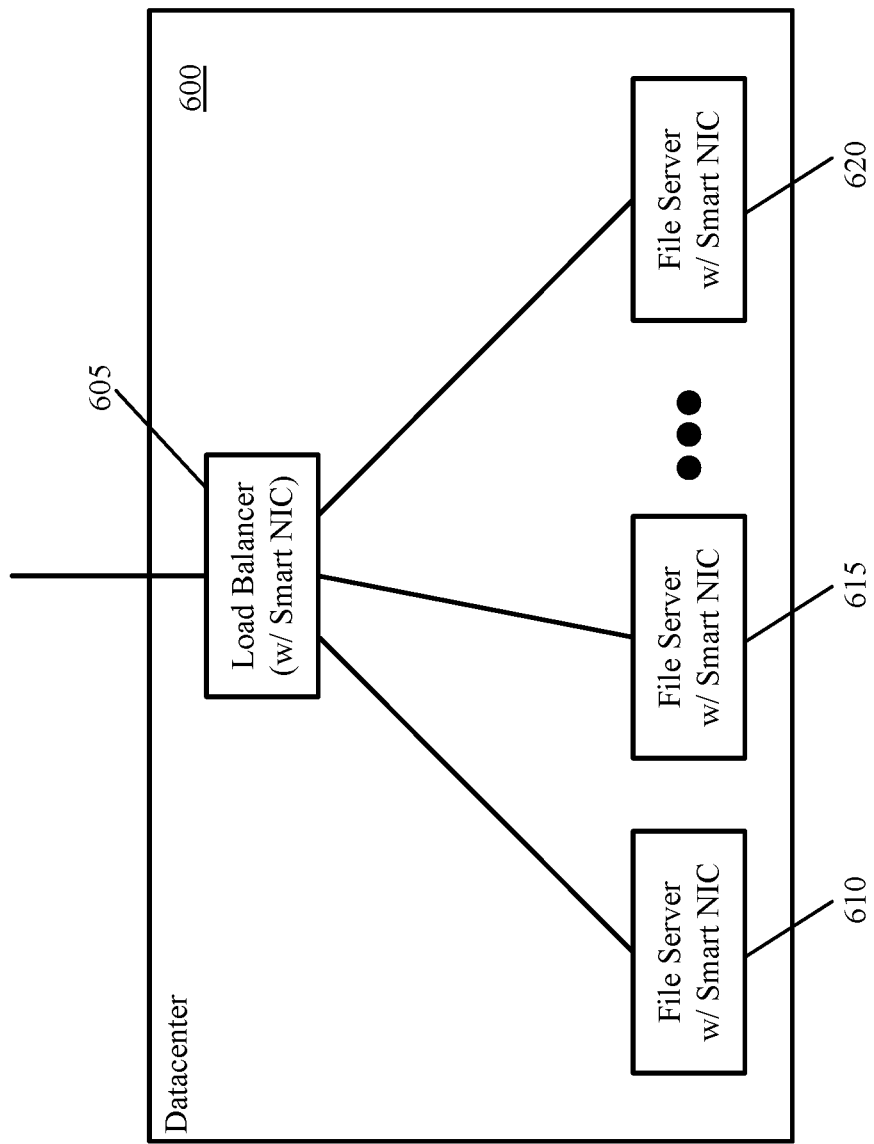
FIG. 6 conceptually illustrates a datacenter with multiple file servers.

FIG. 6 conceptually illustrates an example of such a datacenter 600 with multiple file servers 610-620. Each of these file servers 610-620 includes a smart NIC and a set of storage devices, such as is shown in FIG. 1 or FIG. 3. Some embodiments store the same set of files on each of the file servers 610-620. Other embodiments, however, store different sets of files on each file server 610-620. In the latter case, some files may be stored on only a single server while other files are stored on multiple servers. In either case, the NIC for each of the file servers 610-620 stores its own translation table based on the arrangement of files in its local storage. Thus, even if two file servers store the same set of files, they do not need to store them in the same manner because the translation tables can be different.

When a client request is received at the datacenter 600, a load balancer 605 analyzes the file identifier in the client request to determine to which of the file servers 610-620 the request should be forwarded. If a requested file is located at more than one of the file servers 610-620, the load balancer 605 uses any of a number of different load balancing techniques to select one of these file servers and forward the request to the selected file server. In different embodiments, the load balancer 605 may use round-robin load balancing, an algorithm that accounts for the current load on the different servers (measured in number of active connections, amount of data transferred, etc.), a hash-based distribution, an algorithm that accounts for the capabilities of the different servers, a combination thereof, etc. In some embodiments, for faster processing, a smart NIC located at the load balancer maps the file identifier in a request to a set of servers at which the file is located and/or performs the load balancing to select one of these servers. Once the load balancer 605 forwards the client request to a selected file server, that file server services the request and provides the requested file data as described above.

Figure 7:
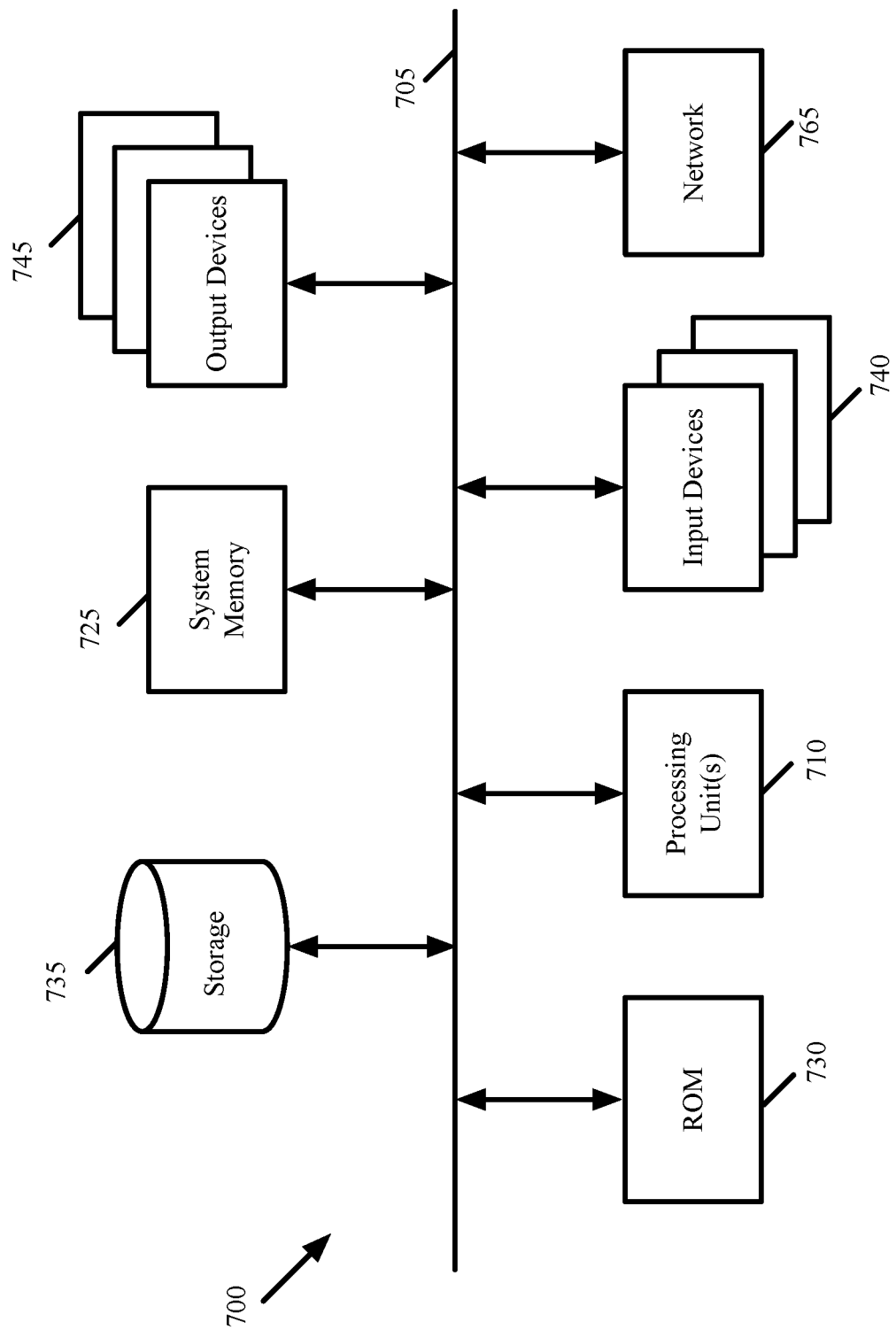
FIG. 7 conceptually illustrates an electronic system with which some embodiments of the invention are implemented.

FIG. 7 conceptually illustrates an electronic system 700 with which some embodiments of the invention are implemented. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random-access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for transmitting data, the method comprising:
at a network interface controller (NIC) of a computer that operates as a server, the computer comprising a plurality of storage devices:
receiving a request from a client device for a particular file;
directly accessing without involvement of a CPU, by the NIC using a translation table stored in a memory of the NIC, a particulate one of the storage devices at the computer, the translating table mapping each file identifier to a device identifier and a memory address of the corresponding device;
translating the particular file into a memory location corresponding to the particular one of the storage devices at the computer; and
transmitting the requested file from the particular storage location to the client device.

2. The method of claim 1, wherein the request comprises a data message storing an identifier for the particular file.

3. The method of claim 2, wherein translating the particular file comprises mapping the identifier to the particular device and memory location.

4. The method of claim 2, wherein the request further comprises an offset indicating a specific portion of the particular file.

5. The method of claim 4, wherein the memory location is a first memory location, wherein translating the particular file comprises:
mapping the identifier to the particular device and a second memory location; and
using the offset to identify the first memory location.

6. The method of claim 1, wherein the plurality of storage devices of the computer comprises a plurality of non-volatile memory express (NVMe) devices.

7. The method of claim 1, wherein the translation of the particular file into a memory location and the transmission of the requested file do not require use of any CPU of the computer.

8. The method of claim 1, wherein:
the translation of the particular file into a memory location is performed by the smart NIC without a CPU of the computer; and
the CPU manages a network connection with the client device.

9. The method of claim 1, wherein:
the computer is a server for a streaming service; and
the request specifies a particular piece of media content and a time offset within the particular piece of media content.

10. The method of claim 1, wherein transmitting the requested file comprises:
reading data from the memory location of the particular storage device; and
sending a set of data messages comprising the data.

11. The method of claim 1, wherein:
the computer operates in a datacenter at which a plurality of files are stored across a plurality of computers operating as servers;
the request is received at a load balancer of the datacenter as a data message from the client device; and
the load balancer selects the computer from the plurality of computers and forwards the data message to the computer.

12. The method of claim 11, wherein the load balancer comprises a NIC of a load balancer computer, wherein the NIC identifies the particular file requested in the data message and selects the computer based on the identification of the particular file.

13. A non-transitory machine-readable medium storing a program for execution by at least one processing unit of a network interface controller (NIC) of a computer that operates as a server and comprises a plurality of storage devices, the program for transmitting data, the program comprising sets of instructions for:
receiving a request from a client device for a particular file;
directly accessing without involvement of a CPU, by the NIC using a translation table stored in a memory of the NIC, a particulate one of the storage devices at the computer, the translating table mapping each file identifier to a device identifier and a memory address of the corresponding device;
translating the particular file into a memory location corresponding to the particular one of the storage devices at the computer; and
transmitting the requested file from the particular storage location to the client device.

14. The non-transitory machine-readable medium of claim 13, wherein the request comprises a data message storing an identifier for the particular file.

15. The non-transitory machine-readable medium of claim 14, wherein the set of instructions for translating the particular file comprises a set of instructions for mapping the identifier to the particular device and memory location.

16. The non-transitory machine-readable medium of claim 14, wherein:
the memory location is a first memory location;
the request further comprises an offset indicating a specific portion of the particular file; and
the set of instructions for translating the particular file comprises sets of instructions for:
mapping the identifier to the particular device and a second memory location; and
using the offset to identify the first memory location.

17. The non-transitory machine-readable medium of claim 13, wherein the translation of the particular file into a memory location and the transmission of the requested file do not require use of any CPU of the computer.

18. The non-transitory machine-readable medium of claim 13, wherein:
the translation of the particular file into a memory location is performed by the smart NIC without a CPU of the computer; and
the CPU manages a network connection with the client device.

19. The non-transitory machine-readable medium of claim 13, wherein:
the computer is a server for a streaming service; and
the request specifies a particular piece of media content and a time offset within the particular piece of media content.

20. The non-transitory machine-readable medium of claim 13, wherein the set of instructions for transmitting the requested file comprises sets of instructions for:
reading data from the memory location of the particular storage device; and
sending a set of data messages comprising the data.

21. The non-transitory machine-readable medium of claim 13, wherein:
the computer operates in a datacenter at which a plurality of files are stored across a plurality of computers operating as servers;
the request is received at a load balancer of the datacenter as a data message from the client device; and
the load balancer selects the computer from the plurality of computers and forwards the data message to the computer.

22. The non-transitory machine-readable medium of claim 21, wherein the load balancer comprises a NIC of a load balancer computer, wherein the NIC identifies the particular file requested in the data message and selects the computer based on the identification of the particular file.

* * * * *